(12) United States Patent
Zhang

(10) Patent No.: US 9,033,234 B2
(45) Date of Patent: May 19, 2015

(54) IC CARD READER AND IC CARD SEAT PROTECTOR THEREOF

(75) Inventor: Yuelei Zhang, Guangdong (CN)

(73) Assignee: SHENZHEN XINGUODU TECHNOLOGY CO., LTD., Shenzhen (CN)

( * ) Notice: Subject to any disclaimer, the term of this patent is extended or adjusted under 35 U.S.C. 154(b) by 140 days.

(21) Appl. No.: 13/883,290

(22) PCT Filed: Sep. 3, 2012

(86) PCT No.: PCT/CN2012/080898
§ 371 (c)(1),
(2), (4) Date: May 3, 2013

(87) PCT Pub. No.: WO2013/075525
PCT Pub. Date: May 30, 2013

(65) Prior Publication Data
US 2013/0214047 A1  Aug. 22, 2013

(30) Foreign Application Priority Data

Nov. 21, 2011  (CN) ...................... 2011 2 0463727 U

(51) Int. Cl.
*G06K 7/06* (2006.01)
*G06K 7/00* (2006.01)

(52) U.S. Cl.
CPC .............. *G06K 7/065* (2013.01); *G06K 7/0039* (2013.01)

(58) Field of Classification Search
CPC .............................. G06K 7/0039; G06K 7/065
USPC ...................... 235/441, 439, 486, 492; 439/92
See application file for complete search history.

(56) References Cited

U.S. PATENT DOCUMENTS

| | | | |
|---|---|---|---|
| 6,183,271 B1 * | 2/2001 | Yu | 439/79 |
| 6,352,438 B1 * | 3/2002 | Wu | 439/92 |
| 6,817,523 B2 * | 11/2004 | Chen et al. | 235/441 |
| 8,270,175 B2 * | 9/2012 | Duan et al. | 361/737 |
| 2013/0178100 A1 * | 7/2013 | Nagata et al. | 439/607.35 |

* cited by examiner

Primary Examiner — Seung Lee

(57) ABSTRACT

An IC card seat protector includes a plastic part including a first and second side arms and a connecting arm connecting therebetween, a flexible printed circuit at least covering the top, bottom and outer lateral faces of the plastic part, a first and second conductive strips; the first side arm has a first through hole formed on one end thereof and the second side arm has a second through hole formed on one end thereof; the first conductive strip is inserted into the first through hole and one end thereof connects to the flexible printed circuit while the other end thereof is exposed on the bottom face of the first side arm; and the second conductive strip is inserted into the second through hole and one end thereof connects to the flexible printed circuit while the other end thereof is exposed on the top face of the second side arm.

10 Claims, 5 Drawing Sheets

IC CARD READER AND IC CARD SEAT PROTECTOR THEREOF

FIELD OF THE INVENTION

The present invention relates to accessories of electronic products, and more particularly to an IC (Integrated Circuit) card seat protector for improving operational performance of an IC card seat and an IC card reader including such an IC card seat protector.

BACKGROUND OF THE INVENTION

With the development of electronic technique, many electronic products and control systems used in daily life are configured with an IC card reader for reading the data of an IC (Integrated Circuit) card. Generally, an IC card seat is configured in the IC card reader to accommodate an IC card and electrically connect the IC card with a connector. However, the existing common IC card readers are not configured with a protector for protecting the IC card seat, so that the safety and reliability of the IC card seat will be negatively impacted.

Thus, it is necessary to provide a protector for an IC card seat, which can comprehensively protect the IC card seat so as to improve the safety and reliability of the IC card seat, to overcome above defects.

SUMMARY OF THE INVENTION

One object of the present invention is to provide an IC card seat protector for improving the safety and reliability of the IC card seat.

Another object of the present invention is to provide an IC card reader including an IC card seat to improve the safety and reliability of the IC card reader.

To achieve above objects, the IC card seat protector provided by the present invention is used in an IC card reader for protecting the IC card seat. The IC card seat protector includes a plastic part, a flexible printed circuit, a first conductive strip and a second conductive strip; the plastic part includes a first side arm, a second side arm and a connecting arm which connects the first side arm with the second side arm; the flexible printed circuit at least covers the top face, bottom face and outer lateral face of the plastic part; the first side arm has a first through hole formed on one end thereof, which is close to the connecting arm, and the second side arm has a second through hole formed on one end thereof, which is far away from the connecting arm; the first conductive strip is inserted into the first through hole and one end thereof electrically connects to the flexible printed circuit while the other end thereof is exposed on the bottom face of the first side arm; and the second conductive strip is inserted into the second through hole and one end thereof electrically connects to the flexible printed circuit while the other end thereof is exposed on the top face of the second side arm.

Preferably, both of the first conductive strip and the second conductive strip are zebra strips.

Preferably, the IC card seat protector further includes a third conductive strip and a fourth conductive strip; the first side arm has a third through hole formed on one end thereof, which is far away from the connecting arm, and the second side arm has a fourth through hole formed on one end thereof, which is close to the connecting arm; the third conductive strip is inserted into the third through hole and two ends thereof are respectively exposed on the top face and the bottom face of the first side arm; and the fourth conductive strip is inserted into the fourth through hole and two ends thereof are respectively exposed on the top face and the bottom face of the second side arm.

Preferably, both of the third conductive strip and the fourth conductive strip are zebra strips.

Preferably, the plastic part further includes a connecting bar, which connects the middle parts of two side arms.

Preferably, the plastic part is a general U-shape integrally-formed structure.

Preferably, the flexible printed circuit is an integrally-formed structure corresponding to the plastic part and covers the top face, bottom face and more than one lateral face of the plastic part.

To achieve above objects, the IC card reader provided by the present invention includes an upper PCB board, a lower PCB board and an IC card seat sandwiched between the upper PCB board and lower PCB board, and further includes an IC card seat protector. The IC card seat protector includes a plastic part, a flexible printed circuit, a first conductive strip and a second conductive strip; the plastic part includes a first side arm, a second side arm and a connecting arm which connects the first side arm with the second side arm; the flexible printed circuit at least covers the top face, bottom face and outer lateral face of the plastic part; the first side arm has a first through hole formed on one end thereof, which is close to the connecting arm, and the second side arm has a second through hole formed on one end thereof, which is far away from the connecting arm; the first conductive strip is inserted into the first through hole and one end thereof electrically connects to the flexible printed circuit while the other end thereof is exposed on the bottom face of the first side arm and electrically connects to the lower PCB board; and the second conductive strip is inserted into the second through hole and one end thereof electrically connects to the flexible printed circuit while the other end thereof is exposed on the top face of the second side arm and electrically connects to the upper PCB board.

Preferably, the IC card seat protector further includes a third conductive strip and a fourth conductive strip; the first side arm has a third through hole formed on one end thereof, which is far away from the connecting arm, and the second side arm has a fourth through hole formed on one end thereof, which is close to the connecting arm; the third conductive strip is inserted into the third through hole and two ends thereof are respectively exposed on the top face and the bottom face of the first side arm so as to electrically connect to the upper PCB board and lower PCB board respectively; and the fourth conductive strip is inserted into the fourth through hole and two ends thereof are respectively exposed on the top face and the bottom face of the second side arm so as to electrically connect to the upper PCB board and lower PCB board respectively.

Preferably, the first conductive strip, second conductive strip, third conductive strip and fourth conductive strip are all zebra strips.

Compared with the prior art, the main body of the IC card seat protector of the present invention is constituted by a plastic part, which is designed to have two side arms to clamp two sides of the IC card seat so as to be fixed on the IC card seat to simultaneously cover three lateral faces of the IC card seat; and a circuit connection between the protector and the IC card reader is achieved by providing a flexible printed circuit covered on the plastic part and providing conductive strips therein, thus, the IC card seat is disposed in a stable circuit environment to improve its safety and reliability greatly. Additionally, the IC card reader provided by the present invention accordingly has higher safety and reliability because of including above-mentioned IC card seat protector.

The present invention will become more clear by means of the following description combining the accompanying drawings, which are used to illustrate embodiments of the present invention.

DESCRIPTION OF THE LABELS IN THE FIGURES

Figure 1:
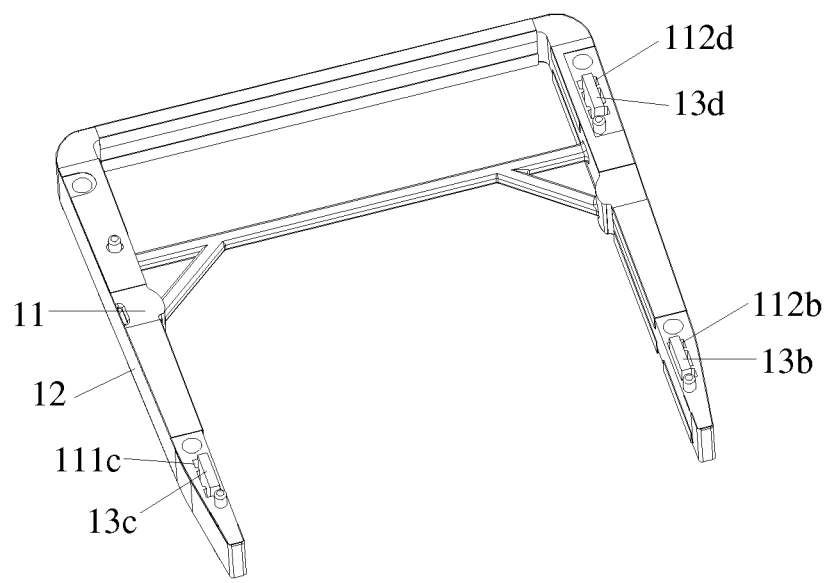
FIG. 1 is a stereogram of an IC card seat protector according to an embodiment of the present invention.

IC card reader 1; IC card seat protector 10; plastic part 11; first side arm 111; first through hole 111a; third through hole 111c; second side arm 112; second through hole 112b; fourth through hole 112d; connecting arm 113; connecting bar 114; flexible printed circuit 12; first conductive strip 13a; second conductive strip 13b; third conductive strip 13c; fourth conductive strip 13d; top PCB board 20; bottom PCB board; IC card seat; card inserting side 41.

DETAILED DESCRIPTION OF ILLUSTRATED EMBODIMENTS

The technical solutions of embodiments will be clear and completely described as follows by combining the figures of the embodiments of the present invention, and similar labels in the figures represent similar components. Obviously, the embodiments described as follows are merely parts of embodiments of the present invention, but not the all. Based on the embodiments of the present invention, other embodiments created by one of ordinary skill in the art without creative work, all belong to the scope of the present invention.

Figure 2:
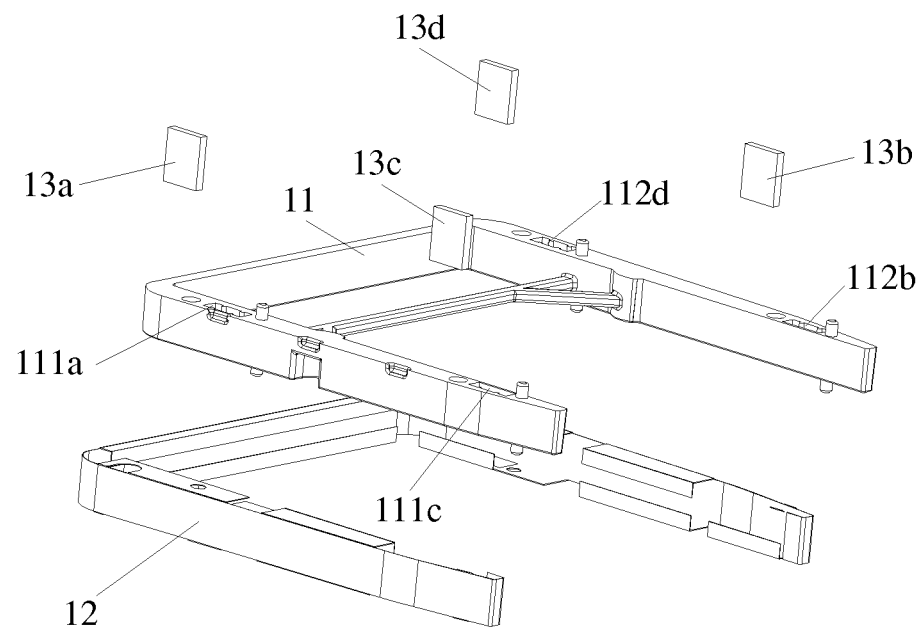
FIG. 2 is an exploded stereogram of the IC card seat protector shown in FIG. 1.
Figure 3:
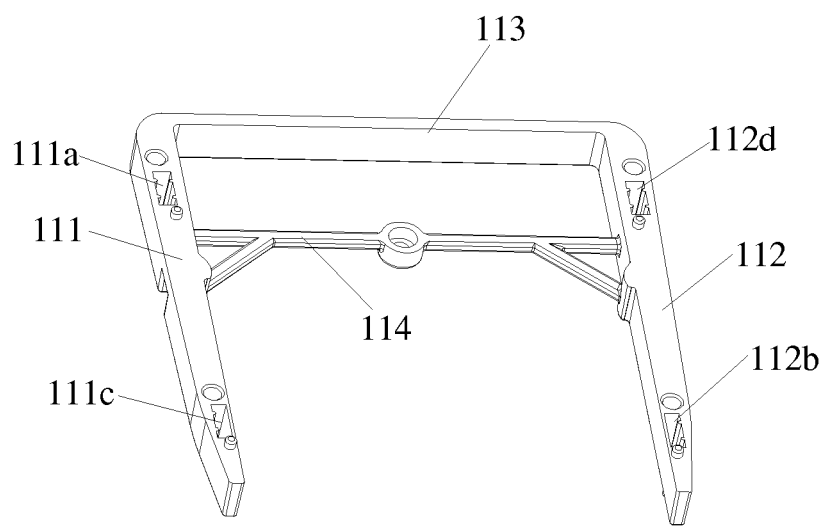
FIG. 3 is a stereogram of a plastic parts of the IC card seat protector shown in FIG. 1.

Firstly, please referring to FIG. 1 to FIG. 3, the IC card seat protector 10 provided by the present invention includes a plastic part 11, a flexible printed circuit 12, a first conductive strip 13a, a second conductive strip 13b, a third conductive strip 13c and a fourth conductive strip 13d. In this specific embodiment, the plastic part 11 is a general U-shaped integrally-formed structure, which includes a first side arm 111, a second side arm 112 and a connecting arm 113 connecting the first side arm 111 and the second side arm 112. The IC card seat protector 10 of the present invention chooses the plastic part 11 as main frame to achieve a certain degree of elastic deformation so as to clamp the IC card seat. To further steady the connection of the protector and IC card seat, the plastic part 11 of this embodiment further includes a connecting bar 114, which connects the middle parts of two side arms 111 and 112, and is located at the end close to the connecting arm 113.

In this embodiment, the flexible printed circuit 12 is an integrally-formed structure corresponding to the plastic part 11. This flexible printed circuit 12 is bonded to the plastic part 11 by adhesives and covers most of surfaces of the plastic part 11, concretely, the flexible printed circuit 12 completely covers the outer lateral face (including the outer lateral faces of the two side arms 111, 112 and the outer lateral face of the connecting arm 113) of the plastic part 11, and covers most of surfaces of the top face, bottom face and inner side face of the plastic part 11.

Referring to FIG. 1 to FIG. 3 again, in this embodiment, the first side arm 111 has a first through hole 111a formed on its one end which is close to the connecting arm 113 and has a third through hole 111c formed on its the other end which is far away from the connecting arm 113; the second side arm 112 has a second through hole 112b formed on its one end which is far away from the connecting arm 113, and has a fourth through hole 112d formed on its the other end which is close to the connecting arm 113. The first conductive strip 13a is inserted into the first through hole 111a and its upper end electrically connects to the flexible printed circuit 12 and its lower end is exposed on the bottom face of the first side arm 111; the second conductive strip 13b is inserted into the second through hole 112b and its lower end electrically connects to the flexible printed circuit 12 and its upper end is exposed on the top face of the second side arm 112; the third conductive strip 13c is inserted into the third through hole 111c and its two ends are respectively exposed on the top face and the bottom face of the first side arm 111; and the fourth conductive strip 13d is inserted into the fourth through hole 112d and its two ends are respectively exposed on the top face and the bottom face of the second side arm 112. In this preferable embodiment, the first, second, third and fourth conductive strips 13a, 13b, 13c and 13d are all zebra strips.

Figure 4:
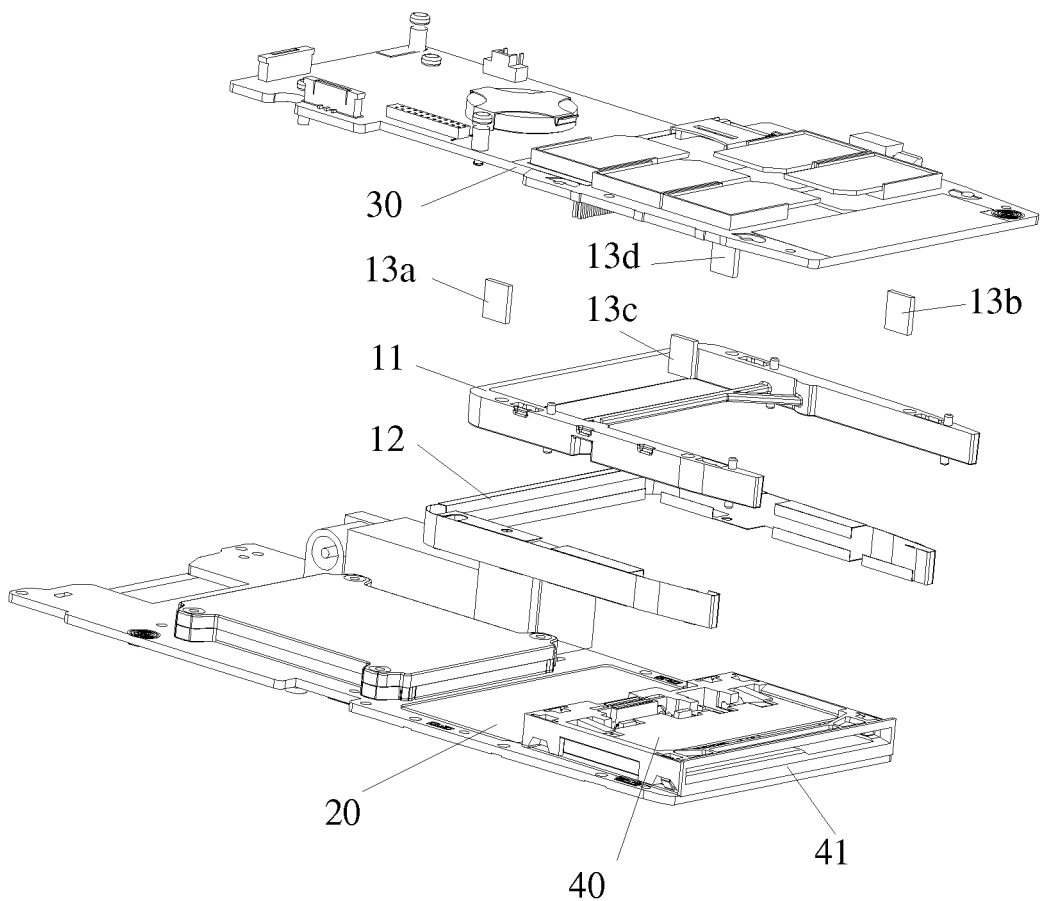
FIG. 4 is an exploded stereogram of an IC card reader according to an embodiment of the present invention.
Figure 5:
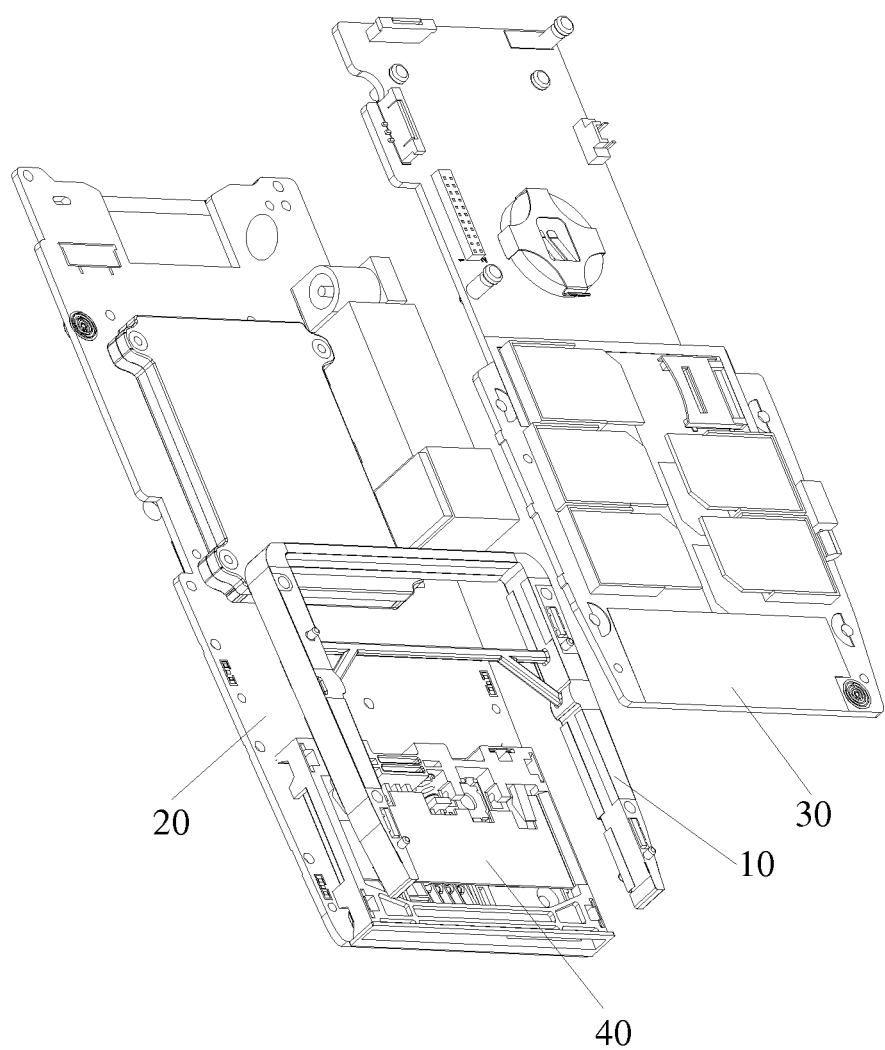
FIG. 5 and FIG. 6 are schematic diagrams illustrating different conditions of the IC card reader shown in FIG. 4 when assembling.
Figure 6:
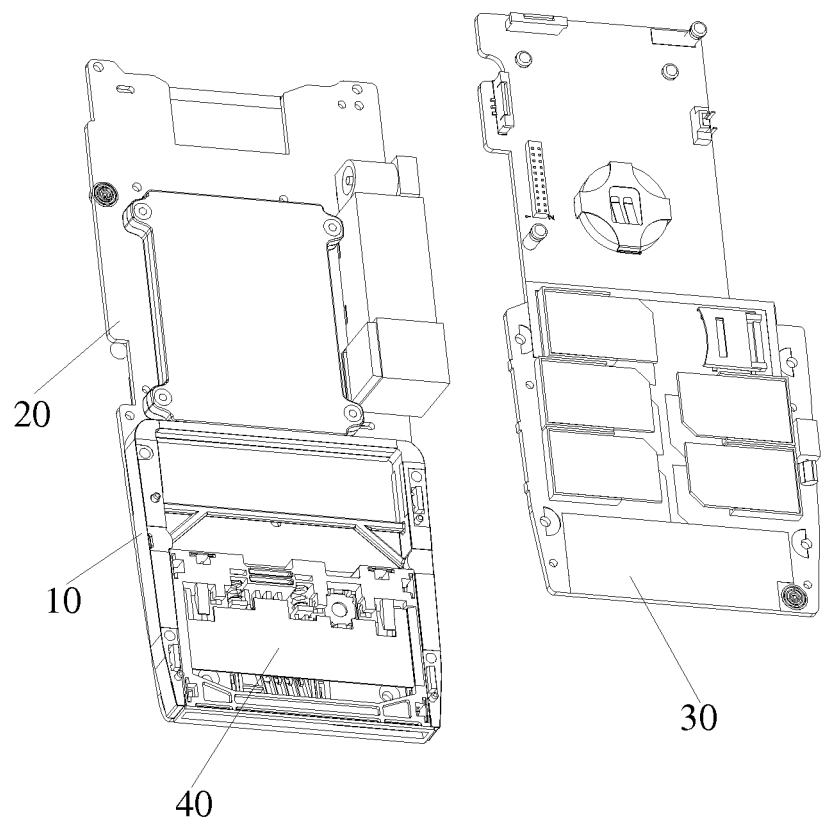

Referring to FIG. 4 to FIG. 6, the IC card reader 1 provided by the present invention includes an upper PCB board 20, a lower PCB board 30, an IC card seat 40 sandwiched between the upper PCB board 20 and lower PCB board 30, and an above mentioned IC card seat protector 10. Specifically, the bottom face of the IC card seat 40 is fixed on the lower PCB board 30, the IC card seat protector 10 encircles three side edges of the IC card seat 40, and the upper PCB board 20 covers the top face of the IC card seat 40, thus, the IC card seat protector 10 together with the upper PCB board 20 and lower PCB board 30 form a chamber with five sides, and the IC card seat 40 is disposed into the chamber, thus, except the card inserting side 41, other five sides of the IC card seat 40 are all encircled. Now, the IC card seat protector 10 is also fixed between the upper PCB board 20 and lower PCB board 30, for the IC card seat protector 10, the exposed lower end of the first conductive strip 13a electrically connects to the lower PCB board 30, the exposed lower end of the second conductive strip 13b electrically connects to the upper PCB board 20, the exposed upper and lower ends of the third conductive strip 13c and fourth conductive strip 13d electrically connect to the upper PCB board 20 and lower PCB board 30 respectively.

As described above, the main body of the IC card seat protector of the present invention is constituted by a plastic part, which is designed to have two side arms to clamp two sides of the IC card seat so as to be fixed on the IC card seat to simultaneously cover three lateral faces of the IC card seat; and a circuit connection between the protector and the IC card reader is achieved by providing a flexible printed circuit covered on the plastic part and providing conductive strips therein, thus, the IC card seat is disposed in a stable circuit environment to improve its safety and reliability greatly. Additionally, the IC card reader provided by the present invention accordingly has higher safety and reliability because of including above-mentioned IC card seat protector.

It should be noted that, in the present invention, the connection between the third conductive strip 13c, the fourth conductive strip 13d and other components can be designed to be the same as that of the first conductive strip 13a and second conductive strip 13b, that is, its one end is coated by the flexible printed circuit 12 so as to electrically connect to the flexible printed circuit 12, and its the other end is exposed so as to connect to the upper PCB board 20 or lower PCB board 30.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. An IC card seat protector, used in an IC card reader for protecting the IC card seat, comprising a plastic part, a flexible printed circuit, a first conductive strip and a second conductive strip, wherein the plastic part comprises a first side arm, a second side arm and a connecting arm which connects the first side arm with the second side arm; the flexible printed circuit at least covers a top face, a bottom face and an outer lateral face of the plastic part; the first side arm has a first through hole formed on one end thereof, which is close to the connecting arm, and the second side arm has a second through hole formed on one end thereof, which is far away from the connecting arm; the first conductive strip is inserted into the first through hole and one end thereof electrically connects to the flexible printed circuit while the other end thereof is exposed on a bottom face of the first side arm; and the second conductive strip is inserted into the second through hole and one end thereof electrically connects to the flexible printed circuit while the other end thereof is exposed on a top face of the second side arm.

2. The IC card seat protector according to claim 1, wherein both of the first conductive strip and the second conductive strip are zebra strips.

3. The IC card seat protector according to claim 1, wherein further comprises a third conductive strip and a fourth conductive strip; the first side arm has a third through hole formed on one end thereof, which is far away from the connecting arm, and the second side arm has a fourth through hole formed on one end thereof, which is close to the connecting arm; the third conductive strip is inserted into the third through hole and two ends thereof are respectively exposed on a top face and the bottom face of the first side arm; and the fourth conductive strip is inserted into the fourth through hole and two ends thereof are respectively exposed on the top face and a bottom face of the second side arm.

4. The IC card seat protector according to claim 3, wherein both of the third conductive strip and the fourth conductive strip are zebra strips.

5. The IC card seat protector according to claim 1, wherein the plastic part further comprises a connecting bar, which connects middle parts of two side arms.

6. The IC card seat protector according to claim 1, wherein the plastic part is a U shape integrally-formed structure.

7. The IC card seat protector according to claim 6, wherein the flexible printed circuit is an integrally-formed structure corresponding to the plastic part and covers the top face, the bottom face and more than one lateral face of the plastic part.

8. An IC card reader, comprising an upper PCB board, a lower PCB board and an IC card seat sandwiched between the upper PCB board and the lower PCB board, wherein the IC card reader further comprises an IC card seat protector, which comprises a plastic part, a flexible printed circuit, a first conductive strip and a second conductive strip; the plastic part comprises a first side arm, a second side arm and a connecting arm which connects the first side arm with the second side arm; the flexible printed circuit at least covers a top face, a bottom face and an outer lateral face of the plastic part; the first side arm has a first through hole formed on one end thereof, which is close to the connecting arm, and the second side arm has a second through hole formed on one end thereof, which is far away from the connecting arm; the first conductive strip is inserted into the first through hole and one end thereof electrically connects to the flexible printed circuit while the other end thereof is exposed on a bottom face of the first side arm and electrically connects to the lower PCB board; and the second conductive strip is inserted into the second through hole and one end thereof electrically connects to the flexible printed circuit while the other end thereof is exposed on a top face of the second side arm and electrically connects to the upper PCB board.

9. The IC card reader according to claim 8, wherein the IC card seat protector further comprises a third conductive strip and a fourth conductive strip; the first side arm has a third through hole formed on one end thereof, which is far away from the connecting arm, and the second side arm has a fourth through hole formed on one end thereof, which is close to the connecting arm; the third conductive strip is inserted into the third through hole and two ends thereof are respectively exposed on a top face and the bottom face of the first side arm so as to electrically connect to the upper PCB board and the lower PCB board respectively; and the fourth conductive strip is inserted into the fourth through hole and two ends thereof are respectively exposed on the top face and a bottom face of the second side arm so as to electrically connect to the upper PCB board and the lower PCB board respectively.

10. The IC card reader according to claim 9, wherein the first conductive strip, the second conductive strip, the third conductive strip and the fourth conductive strip are all zebra strips.

* * * * *